(12) United States Patent
Onitsuka et al.

(10) Patent No.: US 10,780,743 B2
(45) Date of Patent: Sep. 22, 2020

(54) TIRE

(71) Applicant: Sumitomo Rubber Industries, Ltd., Kobe-shi, Hyogo (JP)

(72) Inventors: Rena Onitsuka, Kobe (JP); Isao Sawakami, Kobe (JP); Mahito Arai, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 297 days.

(21) Appl. No.: 15/902,574

(22) Filed: Feb. 22, 2018

(65) Prior Publication Data
US 2018/0264887 A1    Sep. 20, 2018

(30) Foreign Application Priority Data

Mar. 16, 2017   (JP) .................................. 2017-051638
Mar. 31, 2017   (JP) .................................. 2017-071927

(51) Int. Cl.
*B60C 11/03*   (2006.01)
*B60C 11/12*   (2006.01)
*B60C 11/01*   (2006.01)

(52) U.S. Cl.
CPC .......... *B60C 11/0332* (2013.01); *B60C 11/01* (2013.01); *B60C 11/0302* (2013.01);
(Continued)

(58) Field of Classification Search
CPC . B60C 11/03; B60C 11/0302; B60C 11/0309; B60C 11/0332; B60C 11/0304;
(Continued)

(56) References Cited

U.S. PATENT DOCUMENTS

2003/0047263 A1*  3/2003  Lopez ................ B29D 30/0606
                                                    152/209.22
2006/0011280 A1*  1/2006  Yagita ................ B60C 11/0306
                                                    152/209.24
(Continued)

FOREIGN PATENT DOCUMENTS

CN        203902168 U    * 10/2014
DE    102012108847 A1 *  3/2014    ......... B60C 11/0309
(Continued)

OTHER PUBLICATIONS

English translation of DE-102015202613-A1, translated by EPO. (Year: 2016).*
(Continued)

*Primary Examiner* — Leith S Shafi
*Assistant Examiner* — Inja Song
(74) *Attorney, Agent, or Firm* — Birch, Stewart, Kolasch & Birch LLP

(57) ABSTRACT

A tire comprises a tread portion 2. The tread portion 2 comprises two crown land regions 6 and two shoulder land regions 7 divided by a crown main groove 3 and a pair of shoulder main grooves 4 and 5 arranged one by one on each side of the crown main groove 3. Each of the two crown land regions 6 is provided with a plurality of sipes 15 each having a width less than 1.5 mm. The sipes 15 of each of the two crown land regions 6 include only semi-open sipes 18 each having one end connected with one of the main grooves and the other end terminating within the land region. The sipes 15 of the two crown land regions 6 are inclined in a same direction with respect to a tire axial direction.

20 Claims, 12 Drawing Sheets

(52) U.S. Cl.
CPC ........ *B60C 11/0304* (2013.01); *B60C 11/125* (2013.01); *B60C 11/1236* (2013.01); *B60C 11/0309* (2013.01); *B60C 2011/036* (2013.01); *B60C 2011/0341* (2013.01); *B60C 2011/0348* (2013.01); *B60C 2011/0351* (2013.01); *B60C 2011/0358* (2013.01); *B60C 2011/0362* (2013.01); *B60C 2011/0381* (2013.01); *B60C 2011/0383* (2013.01)

(58) Field of Classification Search
CPC ... B60C 11/01; B60C 11/1236; B60C 11/125; B60C 11/1272; B60C 2011/1286; B60C 2011/0348; B60C 2011/0351; B60C 2011/0358; B60C 2011/0341; B60C 2011/0362; B60C 2011/0381; B60C 2011/0383; B60C 2011/036
See application file for complete search history.

(56) References Cited

U.S. PATENT DOCUMENTS

| | | | | |
|---|---|---|---|---|
| 2014/0283967 | A1* | 9/2014 | Inoue | B60C 11/12 152/209.18 |
| 2014/0290820 | A1* | 10/2014 | Hatanaka | B60C 11/033 152/454 |
| 2016/0137006 | A1* | 5/2016 | Yamamoto | B60C 11/0306 152/209.24 |
| 2016/0152090 | A1* | 6/2016 | Takemoto | B60C 11/0306 152/209.24 |
| 2017/0096034 | A1* | 4/2017 | Taniguchi | B60C 11/1272 |
| 2017/0210179 | A1* | 7/2017 | Motomitsu | B60C 9/18 |
| 2018/0134088 | A1* | 5/2018 | Sawakami | B60C 11/0302 |

FOREIGN PATENT DOCUMENTS

| | | | | |
|---|---|---|---|---|
| DE | 102015202613 A1 | * | 8/2016 | ......... B60C 11/1323 |
| EP | 0282765 A1 | | 9/1988 | |
| EP | 2781374 A2 | | 9/2014 | |
| EP | 3219513 A1 | | 9/2017 | |
| EP | 3321104 A1 | | 5/2018 | |
| JP | 2000168317 A | * | 6/2000 | |
| JP | 2006160195 A | * | 6/2006 | |
| JP | 2016-13820 A | | 1/2016 | |

OTHER PUBLICATIONS

English translation of DE-102012108847-A1, translated by EPO. (Year: 2014).*

Extended European Search Report for European Application No. 18159342.7, dated Jul. 30, 2018.

* cited by examiner

TIRE

TECHNICAL FIELD

The present invention relates to a tire capable of exerting excellent steering stability while maintaining wet performance.

BACKGROUND ART

For example, Japanese Unexamined Patent Application Publication No. 2016-013820 (Patent Literature 1) has proposed a tire provided with a plurality of sipes in a crown land region arranged in a central portion of a tread portion. The sipes increase frictional force against a wet road surface by edges thereof, therefore, it is possible to contribute to improvement of the wet performance.

However, the sipes disclosed in Patent Literature 1 include full-open sipes completely crossing the crown land region. The full-open sipes tend to decrease rigidity of the crown land region and consequently the steering stability. Thereby, there was room for further improvement for exerting both of the wet performance and the steering stability.

SUMMARY OF THE INVENTION

The present invention was made in view of the above, and a primary object thereof is to provide a tire capable of exerting excellent steering stability while maintaining the wet performance.

In one aspect of the present invention, a tire comprises a tread portion comprising crown land regions and two shoulder land regions divided by a crown main groove extending in a tire circumferential direction and a pair of shoulder main grooves arranged one by one on each side of the crown main groove, wherein each of the two crown land regions is provided with a plurality of sipes each having a width less than 1.5 mm, the sipes of each of the two crown land regions include only semi-open sipes each having one end connected with one of the main grooves and the other end terminating within the land region, and the sipes of the two crown land regions are inclined in a same direction with respect to a tire axial direction.

In another aspect of the invention, it is preferred that the two crown land regions are not provided with a groove having a width more than 3 mm.

In another aspect of the invention, it is preferred that the tread portion has a pattern whose position when mounted on a vehicle is specified, the two crown land regions include an outer crown land region and an inner crown land region positioned, when the tire is mounted on a vehicle, on an inner side of the vehicle than the outer crown land region, the semi-open sipes provided in the outer crown land region include a plurality of first crown sipes each having the one end connected with the shoulder main groove and a plurality of second crown sipes each having the one end connected with the crown main groove.

In another aspect of the invention, it is preferred that the semi-open sipes provided in the inner crown land region include a plurality of third crown sipes each having the one end connected with the shoulder main groove and a plurality of fourth crown sipes each having the one end connected with the crown main groove.

In another aspect of the invention, it is preferred that a shortest distance L1 in the tire circumferential direction between the other end of one of the first crown sipes and the other end of one of the second crown sipes adjacent thereto is larger than a shortest distance L2 in the tire circumferential direction between the other end of one of the third crown sipes and the other end of one of the fourth crown sipes adjacent thereto.

In another aspect of the invention, it is preferred that the inner crown land region is provided with crown shallow grooves each having a depth less than 2 mm.

In another aspect of the invention, it is preferred that each of the crown shallow grooves extends so as to connect between the other end of one of the third crown sipes and the other end of one of the fourth crown sipes adjacent thereto.

In another aspect of the invention, it is preferred that the crown shallow grooves are inclined to a direction opposite to the sipes with respect to the tire axial direction.

In another aspect of the invention, it is preferred that each of the fourth crown sipes extends so as to be smoothly connected with its adjacent one of the second crown sipes with the crown main groove therebetween.

In another aspect of the invention, it is preferred that at least one of the second crown sipes has a length in the tire axial direction larger than the first crown sipes.

In another aspect of the invention, it is preferred that the second crown sipes overlap with the first crown sipes in the tire axial direction.

In another aspect of the invention, it is preferred that the other ends of the third crown sipes are separated in the tire axial direction from the other ends of the fourth crown sipes.

DESCRIPTION OF THE PREFERRED EMBODIMENT

An embodiment of the present invention will now be described in conjunction with accompanying drawings.

Figure 1:
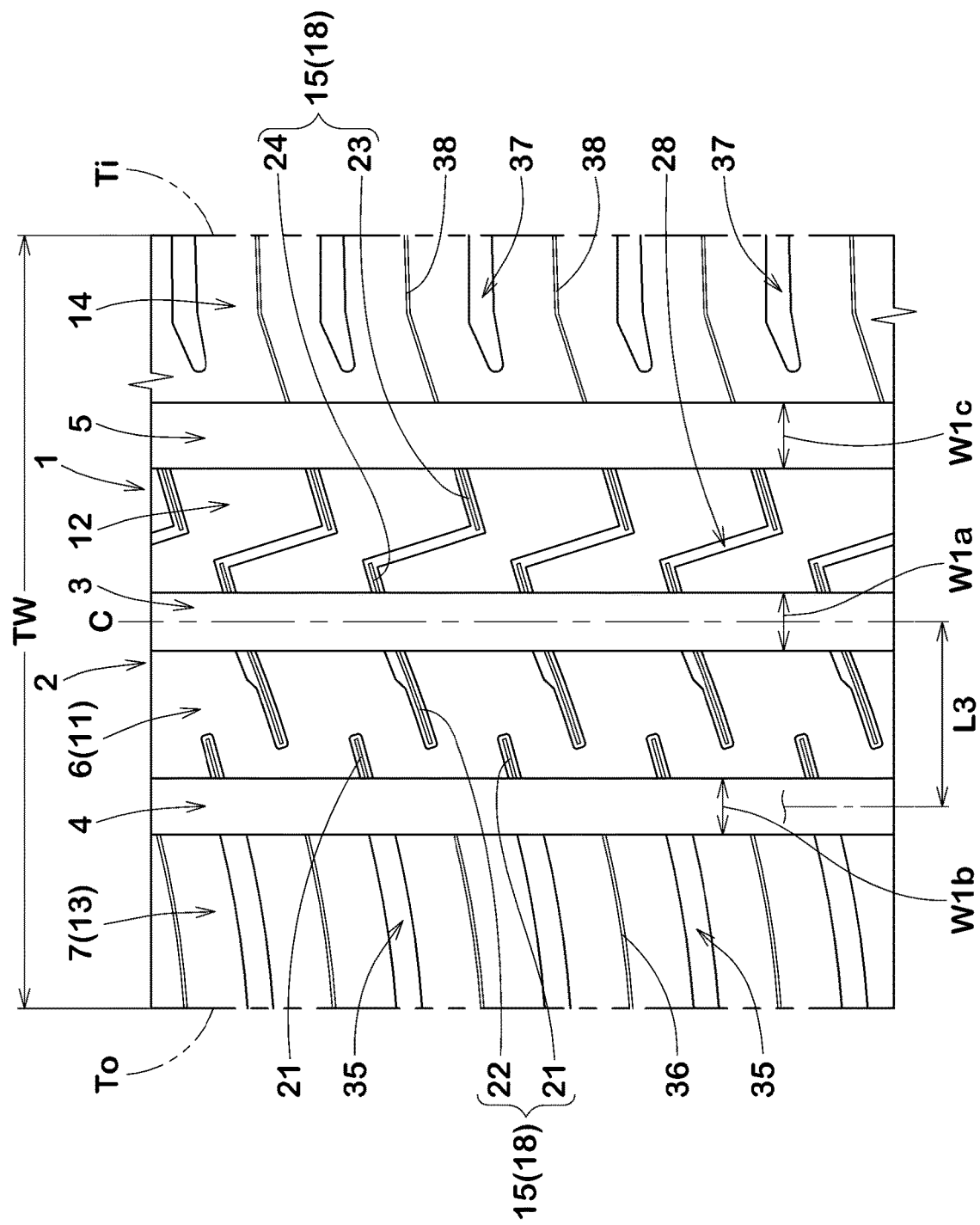
FIG. 1 is a development view of a tread portion as an embodiment of the present invention.

FIG. 1 is a development view of a tread portion 2 of a tire 1 illustrating an embodiment of the present invention. The tire 1 in this embodiment can be used for various tires such as, for example, a pneumatic tire for a passenger car and for heavy load, and a non-pneumatic tire not filled with pressurized air and the like. The tire 1 in this embodiment is suitably used as a pneumatic tire for a passenger car, for example.

As shown in FIG. 1, the tread portion 2 in this embodiment has a tread pattern whose position when mounted on a vehicle is specified. The tread portion 2 has an outer tread edge To positioned, when the tire 1 is mounted on a vehicle, on an outer side of the vehicle and an inner tread edge Ti positioned on an inner side of the vehicle when the tire 1 is mounted on the vehicle. The mounting position of the tire 1 on a vehicle is indicated by a letter or a symbol on a sidewall portion (not shown), for example.

The outer tread edge To and the inner tread edge Ti are outermost ground contacting positions in a tire axial direction of the tire 1 when the tire 1 in a standard state is in contact with a flat surface with zero camber angle by being loaded with a standard tire load. The standard state is a state in which a tire is mounted on a standard rim, inflated to a standard pressure, and loaded with no tire load. In this specification, unless otherwise noted, dimensions and the like of various parts of the tire are values measured in the standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 in this embodiment is provided with main grooves extending continuously in a tire circumferential direction, for example. The main grooves include a crown main groove 3 and a pair of shoulder main grooves 4 and 5 arranged one by one on each side of the crown main groove 3. The crown main groove 3 in this embodiment is arranged on a tire equator C, for example. The shoulder main grooves 4 and 5 include an outer shoulder main groove 4 arranged between the tire equator C and the outer tread edge To and an inner shoulder main groove 5 arranged between the tire equator C and the inner tread edge Ti, for example. As a preferred embodiment, each of the main grooves 3 to 5 extends straight in the tire circumferential direction.

It is preferred that the outer shoulder main groove 4 and the inner shoulder main groove 5 are configured so that a distance L3 between the tire equator C and a groove center line of each of the shoulder main grooves is in a range of from 0.20 to 0.30 times a tread width TW. The tread width TW is a distance in the tire axial direction between the outer tread edge To and the inner tread edge Ti of the tire 1 in the standard state.

It is preferred that the crown main groove 3, the outer shoulder main groove 4, and the inner shoulder main groove 5 respectively have groove widths W1$a$, W1$b$, and W1$c$ in a range of from 6% to 9% of the tread width TW, for example. It is preferred that a total (W1$a$+W1$b$+W1$c$) of the groove widths of the main grooves 3 to 5 is in a range of from 22% to 25% of the tread width TW, for example. Thereby, the wet performance and the steering stability are improved in a good balance.

In a more preferred embodiment, the groove width W1$a$ of the crown main groove 3 is larger than the groove width W1$b$ of the outer shoulder main groove 4. The groove width W1$c$ of the inner shoulder main groove 5 is larger than the groove width W1$a$ of the crown main groove 3. In other words, the groove width of each of the main grooves 3 to 5 is set so as to increase toward the inner tread edge Ti. Thereby, it is possible that excellent drainage performance is exerted in a region between the tire equator C and the inner tread edge Ti. Further, rigidity of a region between the tire equator C and the outer tread edge To is increased, therefore, excellent steering stability is obtained.

The tread portion 2 is divided into two crown land regions 6 and two shoulder land regions 7 by the main grooves 3 to 5 described above. The crown land regions 6 in this embodiment include an outer crown land region 11 and an inner crown land region 12, for example. The outer crown land region 11 is defined as a region between the crown main groove 3 and the outer shoulder main groove 4. The outer crown land region 11 is positioned, when the tire 1 is mounted on a vehicle, on an outer side of the vehicle than the tire equator C. The inner crown land region 12 is defined as a region between the crown main groove 3 and the inner shoulder main groove 5. The inner crown land region 12 is positioned, when the tire 1 is mounted on a vehicle, on an inner side of the vehicle than the outer crown land region 11.

The shoulder land regions 7 in this embodiment include an outer shoulder land region 13 and an inner shoulder land region 14, for example. The outer shoulder land region 13 is defined as a region outside the outer shoulder main groove 4 in the tire axial direction. The inner shoulder land region 14 is defined as a region outside the inner shoulder main groove 5 in the tire axial direction.

Figure 2:
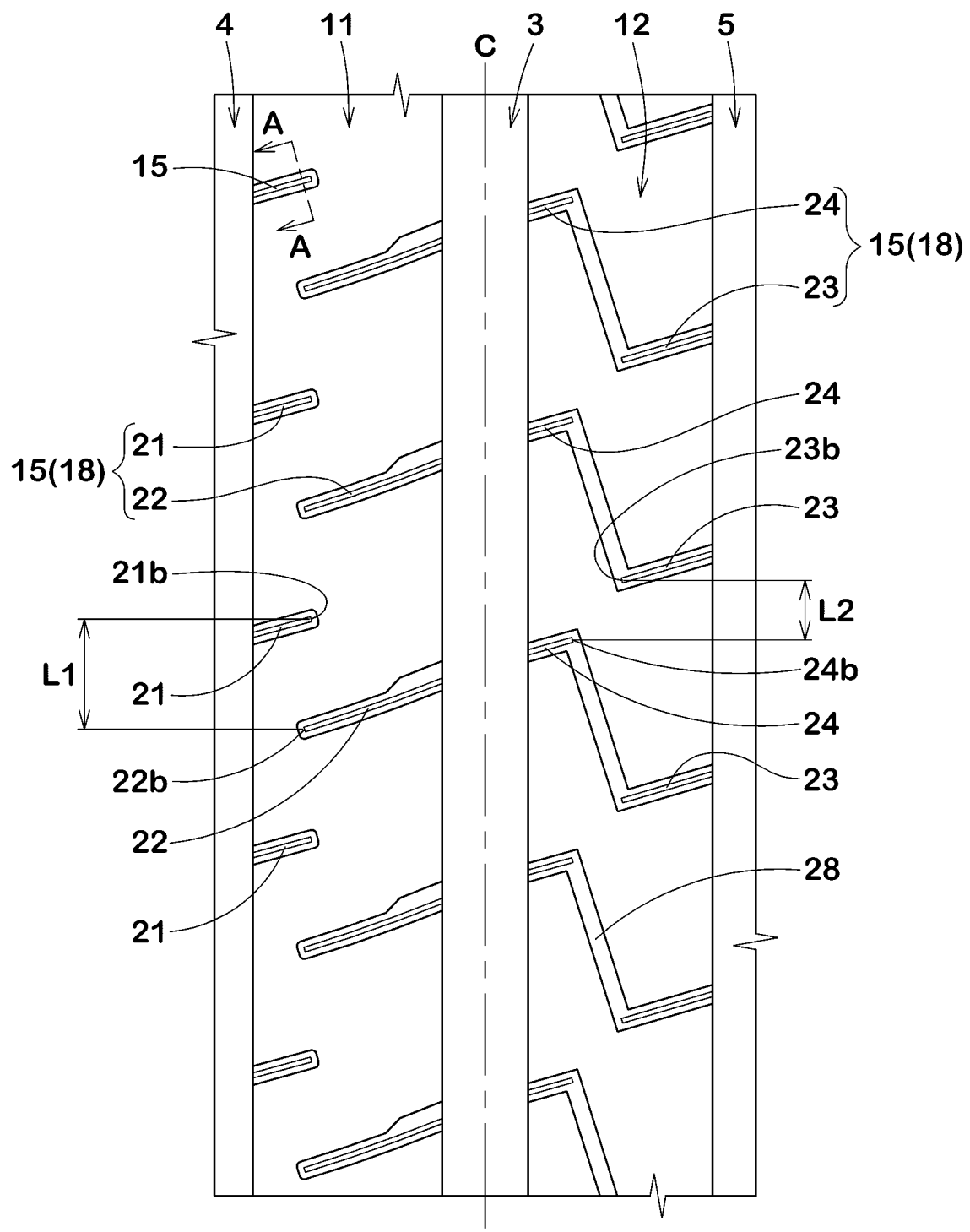
FIG. 2 is an enlarged view of an outer crown land region and an inner crown land region of FIG. 1.

FIG. 2 is an enlarged view of the outer crown land region 11 and the inner crown land region 12. As shown in FIG. 2, each of the outer crown land region 11 and the inner crown land region 12 is provided with a plurality of sipes 15. In this specification, the sipes 15 is defined as cuts or grooves each having a width less than 1.5 mm.

Figure 3:
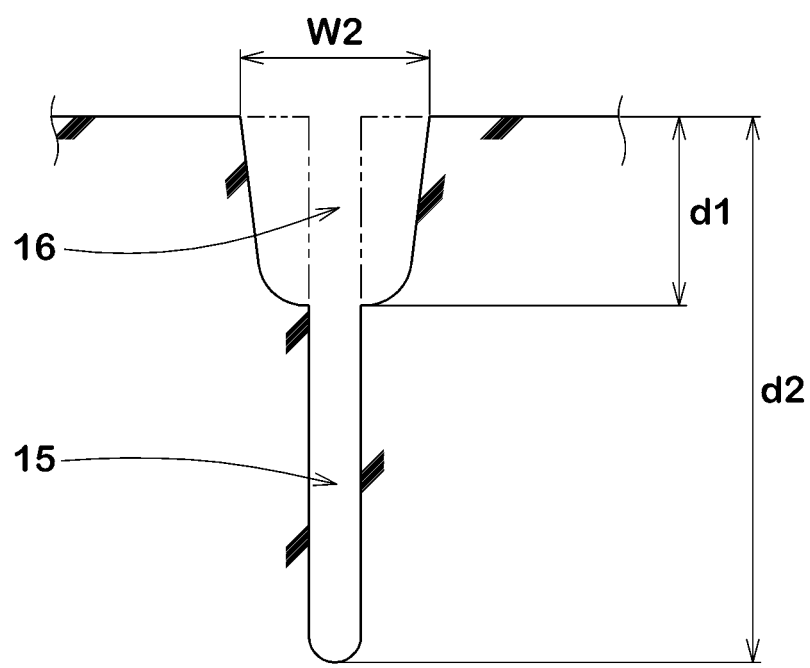
FIG. 3 is a cross-sectional view taken along A-A line of FIG. 2.

FIG. 3 is a cross-sectional view of one of the sipes 15 taken along A-A line of FIG. 2. As shown in FIG. 3, each of the sipes 15 in this embodiment may be configured to extend from a bottom portion of a shallow groove 16 having a depth d1 less than 2.0 mm, for example. However, the sipes 15 are not limited to such an embodiment, and may be configured to extend from a ground contacting surface of the land regions as indicated by an imaginary line. It is preferred that a depth d2 of each of the sipes 15 from the ground contacting surface of the land regions is in a range of from 5.0 to 7.0 mm, for example. It is preferred that the shallow groove 16 in this embodiment has an opening width w2 in a range of from 2.0 to 5.0 mm at the ground contacting surface of the land regions, for example.

As shown in FIG. 2, each of the sipes 15 provided in the outer crown land region 11 and the inner crown land region 12 is only a semi-open sipe 18 having one end connected with one of the main grooves and the other end terminating within the land region. The semi-open sipes 18 configured as such maintain rigidity of the crown land regions 11 and 12, therefore, they are useful for exerting excellent steering stability.

Each of the sipes 15 is inclined in the same direction with respect to the tire axial direction. In the drawings of this specification, each of the sipes 15 is inclined to upper right. Thereby, when the crown land regions 11 and 12 contact with the ground on a wet road surface, each of the sipes 15 cooperates, therefore, it is possible that the water on the road surface is guided to one direction in the tire axial direction. Thereby, it becomes easy for the crown land regions 11 and 12 to push out the water smoothly, and consequently, the wet performance is maintained.

In a more preferred embodiment, it is preferred that the outer crown land region 11 and the inner crown land region 12 are not provided with a groove having a width not less than 3 mm. Thereby, the rigidity of each of the crown land regions 11 and 12 is increased, therefore, it is possible that excellent steering stability is exerted. Note that the "groove having a width not less than 3 mm" means a groove having a distance between a pair of groove walls thereof is not less than 3 mm and a depth not less than 2 mm, and the shallow groove 16 is excluded. In order to maintain the steering stability on a dry road surface high, it is more preferred that the outer crown land region 11 and the inner crown land region 12 are not provided with a groove having a width not less than 1.5 mm and a depth not less than 2.0 mm.

Figure 4:
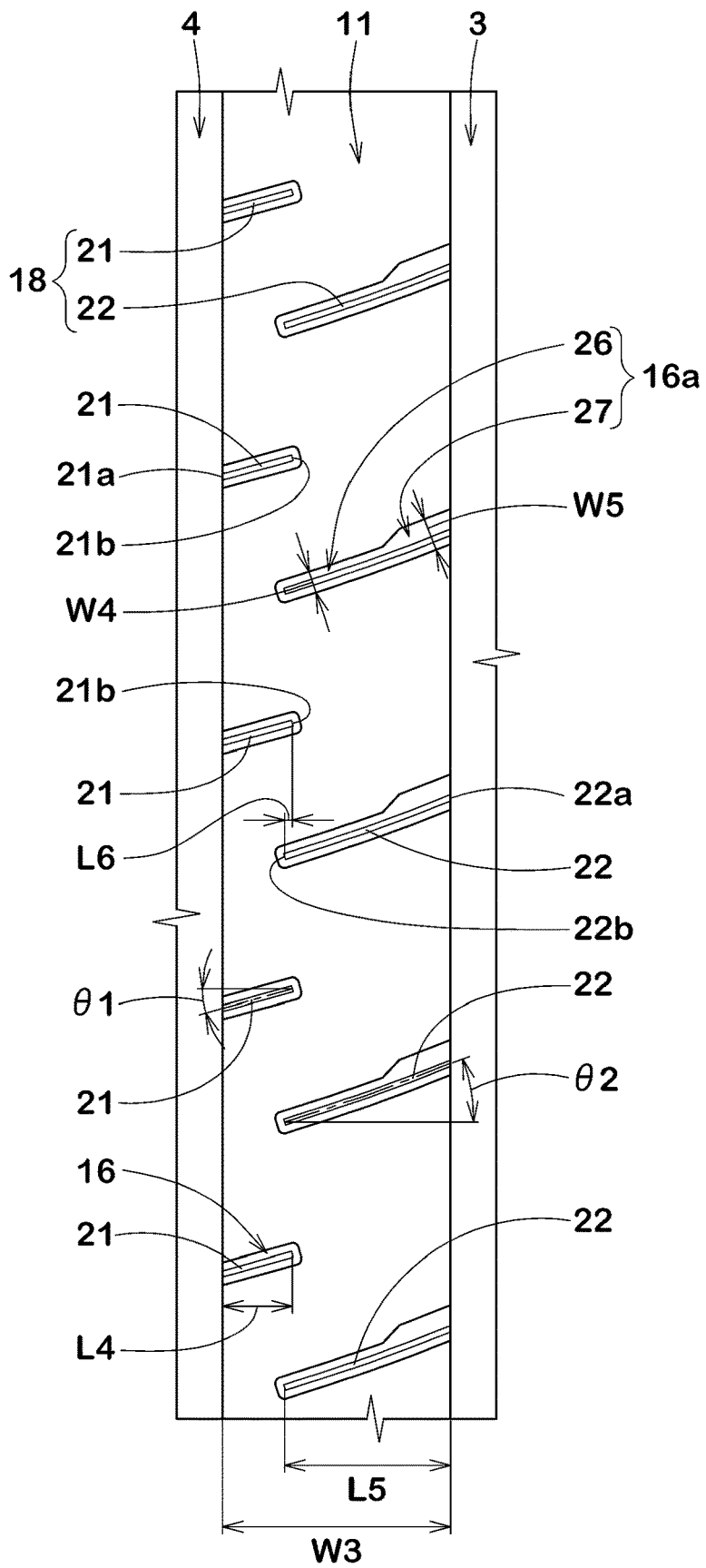
FIG. 4 is an enlarged view of the outer crown land region of FIG. 1.

FIG. 4 is an enlarged view of the outer crown land region 11. As shown in FIG. 4, the semi-open sipes 18 provided in the outer crown land region 11 include a plurality of first crown sipes 21 and a plurality of second crown sipes 22, for example. Each of the first crown sipes 21 has one end 21a connected with the outer shoulder main groove 4 and the other end 21b terminating within the outer crown land region 11, for example. Each of the second crown sipes 22 has one end 22a connected with the crown main groove 3 and the other end 22b terminating within the outer crown land region 11. The first crown sipes 21 and the second crown sipes 22 in this embodiment are arranged alternately in the tire circumferential direction.

It is preferred that the first crown sipes 21 are inclined at an angle θ1 in a range of from 15 to 25 degrees with respect to the tire axial direction, for example. Similarly, it is preferred that the second crown sipes 22 are inclined at an angle θ2 in a range of from 15 to 25 degrees with respect to the tire axial direction, for example. The first crown sipes 21 and the second crown sipes 22 configured as such can provide frictional force in the tire circumferential direction and the tire axial direction in a good balance during running on a wet road surface.

It is preferred that each of the first crown sipes 21 has a length L4 in a range of from 0.25 to 0.35 times a width w3 of the outer crown land region 11, for example. The first crown sipes 21 configured as such maintain the rigidity of axially outer part of the outer crown land region 11, therefore, they are useful for exerting excellent steering stability.

It is preferred that at least one of the second crown sipes 22 has a length L5 in the tire axial direction larger than the first crown sipes 21, for example. It is preferred that the length L5 of the at least one of the second crown sipes 22 is in a range of from 0.70 to 0.80 times the width w3 of the outer crown land region 11, for example. The second crown sipes 22 configured as such are useful for exerting excellent wet performance together with the crown main groove 3.

A ratio L4/L5 of the length L4 of the first crown sipe 21 and the length L5 of the second crown sipe 22 is preferably not less than 0.35, more preferably not less than 0.40, and preferably not more than 0.55, more preferably not more than 0.50. The first crown sipes 21 and the second crown sipes 22 configured as such can improve the wet performance while suppressing excessive decrease in rigidity of a part of the outer crown land region 11 positioned on an inner side of the vehicle.

In a preferred embodiment, it is preferred that the second crown sipes 22 overlap with the first crown sipes 21 in the tire axial direction when viewed in the tire circumferential direction. In other words, the other ends 22b of the second crown sipes 22 are positioned outside the other ends 21b of the first crown sipes 21 in the tire axial direction. It is preferred that an overlapping width L6 in the tire axial direction between each of the second crown sipes 22 and each of the first crown sipes 21 is in a range of from 2.0% to 4.0% of the width w3 of the outer crown land region 11, for example. Such arrangement of the crown sipes 21 and 22 is helpful for improving the wet performance and the steering stability in a good balance.

It is preferred that each of shallow grooves 16a extending radially outwardly and continuously from one of the second crown sipes 22 includes an inner portion 26 and an outer portion 27 having different opening widths at the ground contacting surface of the land region, for example. The inner portion 26 extends with an opening width W4 within the outer crown land region 11, for example. The outer portion 27 extends between the inner portion 26 and the crown main groove 3 and has an opening width W5 larger than the opening width W4, for example. It is preferred that a ratio W4/W5 of the opening width W4 of the inner portion 26 and the opening width W5 of the outer portion 27 is in a range of from 0.60 to 0.80, for example. Thereby, it becomes easy for each of the second crown sipes 22 to open moderately on a side of the one end 22a, therefore, the wet performance is improved.

Figure 5:
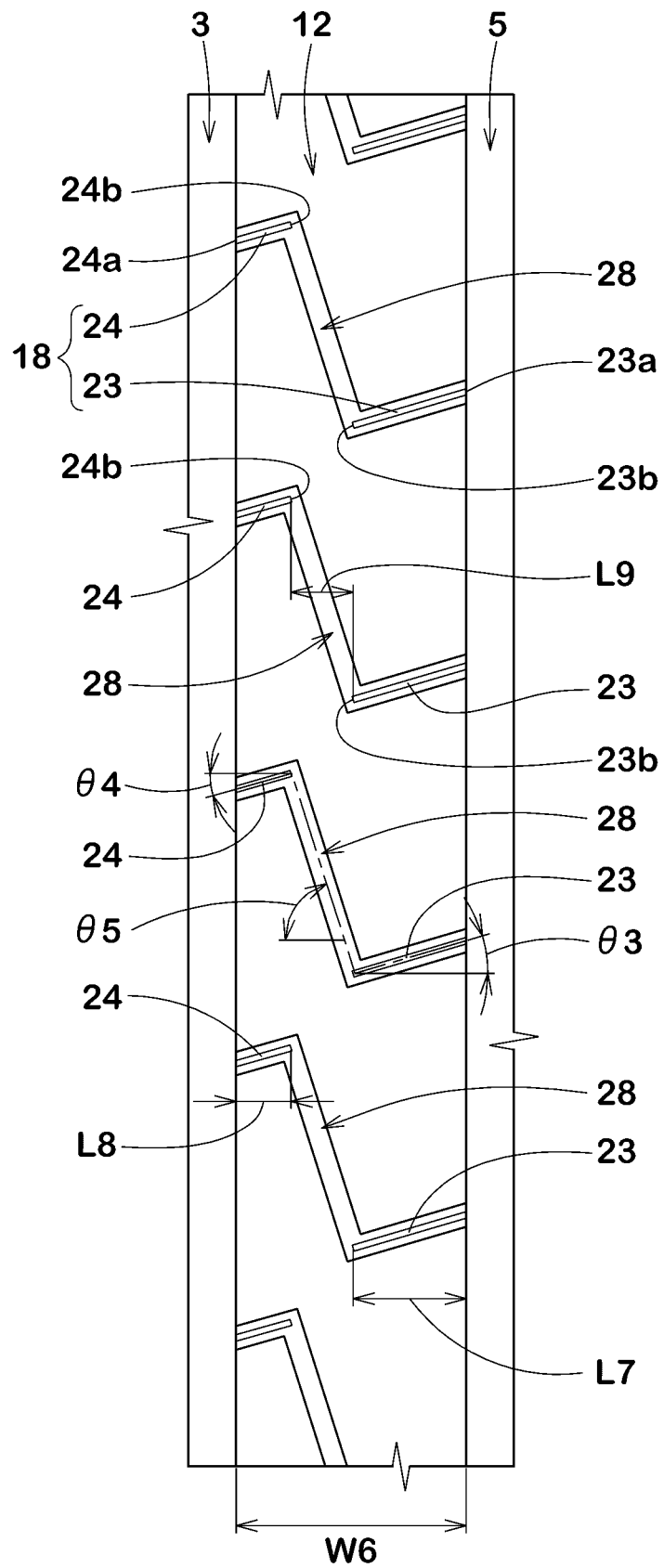
FIG. 5 is an enlarged view of the inner crown land region of FIG. 1.

FIG. 5 is an enlarged view of the inner crown land region 12. As shown in FIG. 5, the semi-open sipes 18 provided in the inner crown land region 12 include a plurality of third crown sipes 23 and a plurality of fourth crown sipes 24, for example. Each of the third crown sipes 23 has one end 23a connected with the inner shoulder main groove 5 and the other end 23b terminating within the inner crown land region 12, for example. Each of the fourth crown sipes 24 has one end 24a connected with the crown main groove 3 and the other end 24b terminating within the inner crown land region 12. The third crown sipes 23 and the fourth crown sipes 24 in this embodiment are arranged alternately in the tire circumferential direction.

Each of the third crown sipes 23 is inclined at an angle θ3 in a range of from 15 to 25 degrees with respect to the tire axial direction, for example. The third crown sipes 23 configured as such can provide frictional force in the tire circumferential direction and in the tire axial direction in a good balance during running on a wet road surface.

It is preferred that each of the third crown sipes 23 has a length L7 in the tire axial direction in a range of from 0.40 to 0.50 times a width w6 in the tire axial direction of the inner crown land region 12. In a preferred embodiment, the length L7 of the third crown sipe 23 is larger than the length L4 (shown in FIG. 4) of the first crown sipe 21, for example. The length L7 of the third crown sipe 23 is smaller than the length L5 (shown in FIG. 4) of the second crown sipe 22, for example. The third crown sipes 23 configured as such makes a rigidity distribution of the outer crown land region 11 and the inner crown land region 12 appropriate, therefore, it is possible that progression of wear of these crown land regions is made uniform.

As shown in FIG. 2, it is preferred that each of the fourth crown sipes 24 extends so as to be smoothly connected with its adjacent one of the second crown sipes 22 with the crown main groove 3 therebetween, for example. Note that "smoothly connected" at least means an embodiment in which one of the sipes is connected to an end portion of the other sipe when the one of the sipes is imaginarily extended in a longitudinal direction thereof.

As shown in FIG. 5, each of the fourth crown sipes 24 is inclined at an angle θ4 in a range of from 15 to 25 degrees with respect to the tire axial direction, for example. In a preferred embodiment, the fourth crown sipes 24 are arranged in parallel with the third crown sipes 23.

It is preferred that each of the fourth crown sipes 24 has a length L8 in the tire axial direction in a range of from 0.20 to 0.30 times the width w6 of the inner crown land region 12, for example. In a preferred embodiment, the length L8 of the fourth crown sipe 24 is smaller than the length L7 of the third crown sipe 23, for example. The fourth crown sipes 24 configured as such maintain rigidity of the inner crown land region 12, therefore, it is possible that the steering stability is improved.

A ratio L8/L7 of the length L8 of the fourth crown sipe 24 and the length L7 of the third crown sipe 23 is preferably not less than 0.35, more preferably not less than 0.40, and preferably not more than 0.55, more preferably not more than 0.50. The third crown sipes 23 and the fourth crown sipes 24 configured as such can improve the wet performance while suppressing excessive decrease in rigidity of a part of the inner crown land region 12 positioned on an inner side of the vehicle.

In a more preferred embodiment, the fourth crown sipes 24 and the third crown sipes 23 do not overlap in the tire axial direction when viewed in the tire circumferential direction. The other ends 23b of the third crown sipes 23 are separated in the tire axial direction from the other ends 24b of the fourth crown sipes 24. More specifically, the other ends 24b of the fourth crown sipes 24 are located on a side of the tire equator C of the other ends 23b of the third crown sipes 23. It is preferred that a separation width L9 in the tire axial direction between each of the other ends 24b of the fourth crown sipes 24 and its adjacent one of the other ends 23b of the third crown sipes 23 is in a range of from 0.15 to 0.30 times the width w6 of the inner crown land region 12, for example. Such arrangement of the third crown sipes 23 and the fourth crown sipes 24 can exert excellent steering stability while maintaining the wet performance.

As shown in FIG. 2, it is preferred that a shortest distance L1 in the tire circumferential direction between the other end 21b of the first crown sipe 21 and the other end 22b of the second crown sipe 22 is larger than a shortest distance L2 in the tire circumferential direction between the other end 23b of the third crown sipe 23 and the other end 24b of the fourth crown sipe 24. It is preferred that the shortest distance L1 is in a range of from 1.5 to 2.0 times the shortest distance L2, for example. Such arrangement of each of the sipes can make rigidity of the outer crown land region 11 higher than that of the inner crown land region 12, and in particular can improve the steering stability during cornering.

As shown in FIG. 5, it is preferred that the inner crown land region 12 is provided with crown shallow grooves 28. Each of the crown shallow grooves 28 has a depth less than 2 mm and extends so as to connect between the other end 23b of one of the third crown sipes 23 and the other end 24b of its adjacent one of the fourth crown sipes 24, for example. The crown shallow grooves 28 configured as such can improve the wet performance while maintaining rigidity of the inner crown land region 12.

The crown shallow grooves 28 in this embodiment are inclined in the direction opposite to each of the sipes 15 with respect to the tire axial direction, for example. It is preferred that each of the crown shallow grooves 28 is inclined at an angle θ5 in a range of from 60 to 80 degrees with respect to the tire axial direction, for example. The crown shallow grooves 28 configured as such provide large frictional force in the tire axial direction by edges thereof, therefore, cornering performance during running on a wet road surface is improved.

Figure 6:
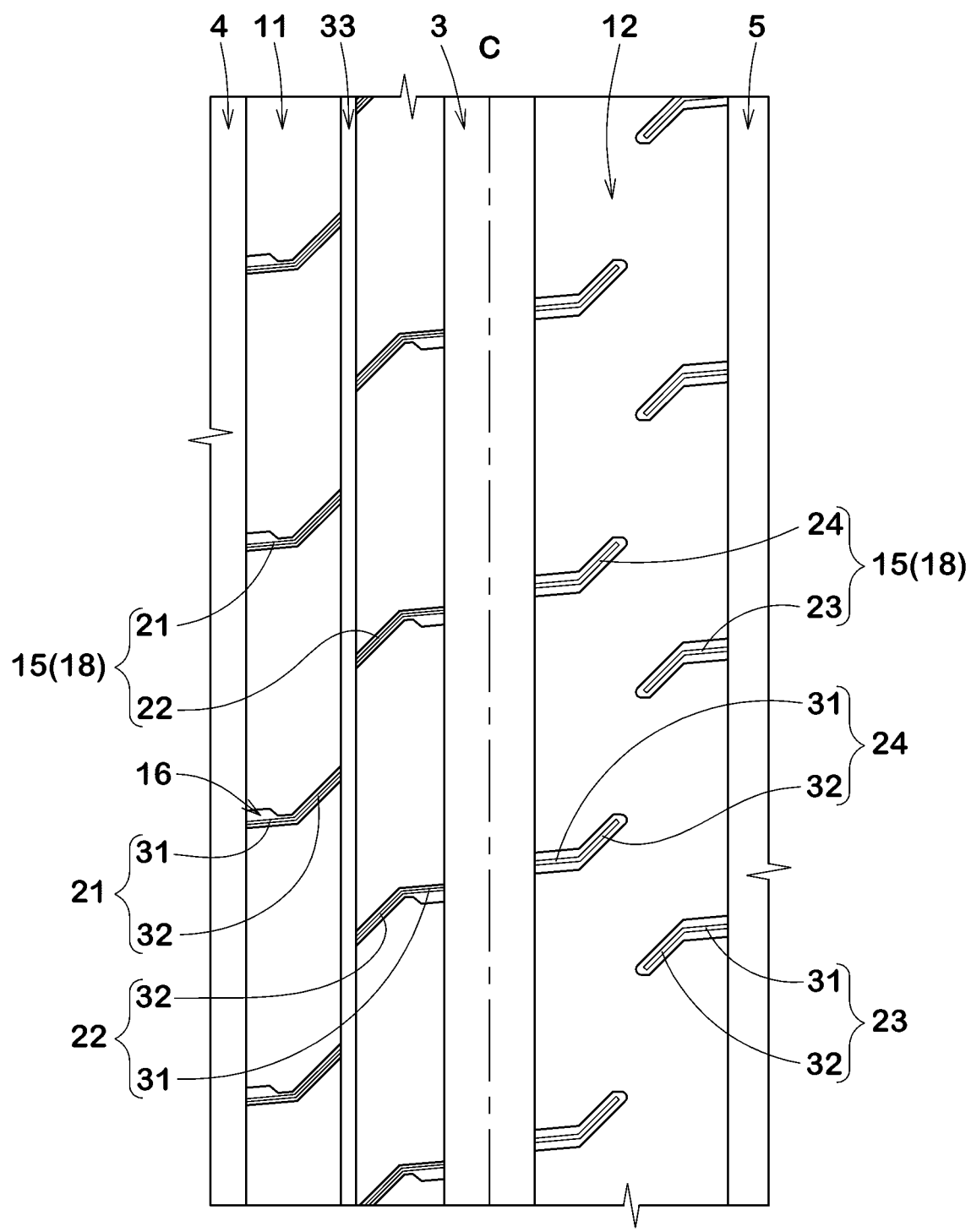
FIG. 6 is an enlarged view of the inner crown land region and the outer crown land region in another embodiment of the present invention.

FIG. 6 illustrates the outer crown land region 11 and the inner crown land region 12 as an example of another embodiment of the present invention. As shown in FIG. 6, each of the sipes 15 in this embodiment is configured to have a bent portion. Each of the sipes 15 configured as such can provide frictional force in multiple directions during running on a wet road surface.

Each of the sipes 15 includes a first part 31 and a second part 32 having a different inclination angle with respect to the tire axial direction, for example. The first part has the one end connected with one of the main grooves, for example. The second part 32 extends continuously from the first part 31 and obliquely at an angle larger than the first part 31 with respect to the tire axial direction so as to have the other end terminating within the land region, for example. Each of the sipes 15 configured as such can increase apparent rigidity of the land region when opposing sipewalls thereof come into close contact with each other.

It is preferred that in each of the shallow grooves 16 connected with the sipes 15, the first part 31 has an opening width larger than that of the second part 32, for example. The shallow grooves 16 configured as such can further improve the wet performance.

It is preferred that one of the outer crown land region 11 and the inner crown land region 12 is provided with a circumferential shallow groove 33 having a depth less than 2.0 mm and extending continuously in the tire circumferential direction, for example. The circumferential shallow groove 33 in this embodiment is provided in the outer crown land region 11. The circumferential shallow groove 33 can improve the wet performance while maintaining rigidity of the land region.

Figure 7:
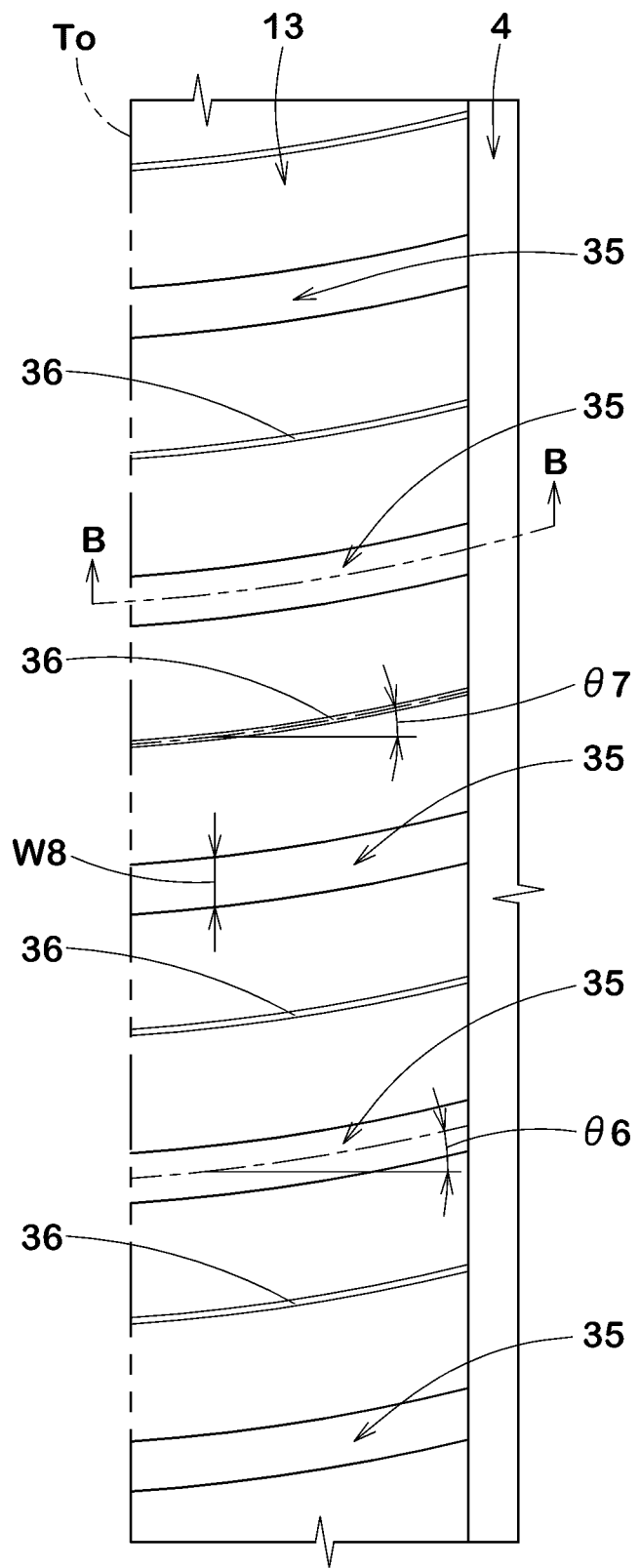
FIG. 7 is an enlarged view of an outer shoulder land region of FIG. 1.

FIG. 7 is an enlarged view of the outer shoulder land region 13. As shown in FIG. 7, the outer shoulder land region 13 is provided with a plurality of outer shoulder lateral grooves 35 and a plurality of outer shoulder sipes 36, for example. The outer shoulder lateral grooves 35 and the outer shoulder sipes 36 in this embodiment are arranged alternately in the tire circumferential direction.

Each of the outer shoulder lateral grooves 35 has one end connected with the outer shoulder main groove 4, for example. In a preferred embodiment, the outer shoulder lateral grooves 35 extend so as to connect between the outer shoulder main groove 4 and the outer tread edge To, for example. It is preferred that each of the outer shoulder lateral grooves 35 has a groove width w8 in a range of from 0.30 to 0.50 times the groove width w1b (shown in FIG. 1) of the outer shoulder main groove 4, for example. The outer shoulder lateral grooves 35 configured as such can improve the steering stability and the wet performance on a dry road surface in a good balance together with the main grooves and the crown land regions described above.

It is preferred that each of the outer shoulder lateral grooves 35 extends in a smoothly curved manner so that an angle θ6 thereof with respect to the tire axial direction gradually increases axially inwardly, for example. It is preferred that the angle θ6 is in a range of from 5 to 20 degrees, for example. The outer shoulder lateral grooves 35 configured as such can guide water in the grooves smoothly toward the outer tread edge To during running on a wet road surface, therefore, it is possible that further excellent wet performance is exerted.

Figure 8:
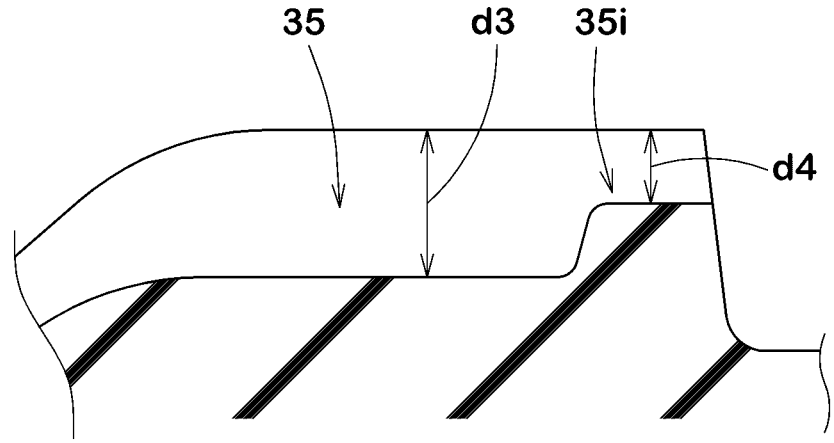
FIG. 8 is a cross-sectional view taken along B-B line of FIG. 7.

FIG. 8 is a cross-sectional view of one of the outer shoulder lateral grooves 35 taken along B-B line. As shown in FIG. 8, it is preferred that each of the outer shoulder lateral grooves 35 has a raised bottom surface at an inner end portion 35*i* in the tire axial direction, for example. It is preferred that a depth d4 of the inner end portion 35*i* is in a range of from 0.50 to 0.60 times a maximum depth d3 of the outer shoulder lateral groove 35, for example. The outer shoulder lateral grooves 35 configured as such increase rigidity of an axially inner part of the outer shoulder land region 13, therefore, it is possible that the steering stability is further improved.

As shown in FIG. 1, it is preferred that each of the outer shoulder lateral grooves 35 extends so as to be smoothly connected with one of the first crown sipes 21 adjacent thereto with the shoulder main groove 4 therebetween, for example. The outer shoulder lateral grooves 35 configured as such can improve the wet performance in cooperation with the first crown sipes 21.

As shown in FIG. 7, the outer shoulder sipes 36 completely cross the outer shoulder land region 13, for example. It is preferred that each of the outer shoulder sipes 36 extends in a smoothly curved manner so that an angle θ7 with respect to the tire axial direction gradually increases axially inwardly, for example. It is preferred that the angle θ7 is in a range of from 5 to 20 degrees, for example. In a more preferred embodiment, the outer shoulder sipes 36 extend along the outer shoulder lateral grooves 35. The outer shoulder sipes 36 configured as such suppresses distortion of ground contacting surface of the outer shoulder land region 13, therefore, it is possible that uneven wear thereof is suppressed.

Figure 9:
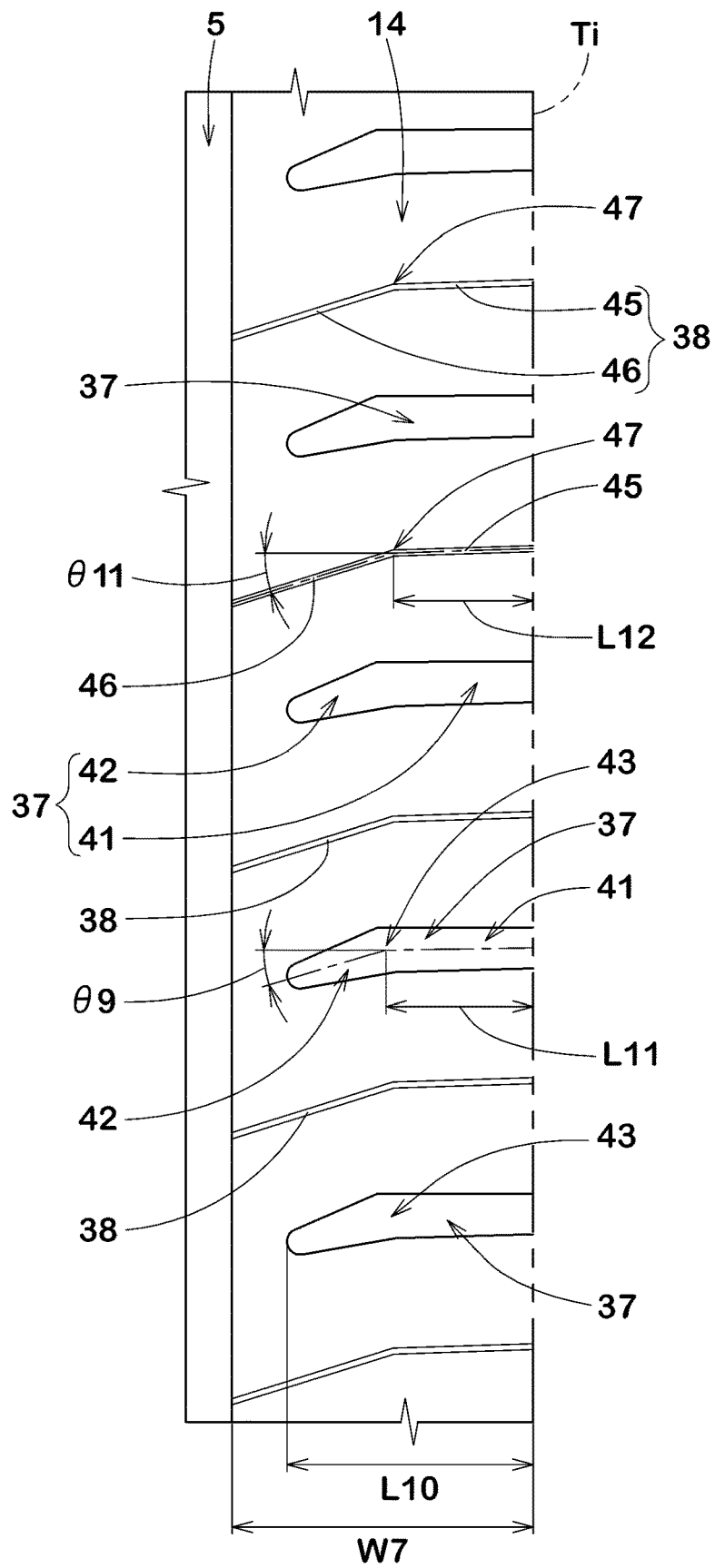
FIG. 9 is an enlarged view of an inner shoulder land region of FIG. 1.

FIG. 9 is an enlarged view of the inner shoulder land region 14. As shown in FIG. 9, the inner shoulder land region 14 is provided with a plurality of inner shoulder lateral grooves 37 and a plurality of inner shoulder sipes 38, for example. The inner shoulder lateral grooves 37 and the inner shoulder sipes 38 in this embodiment are arranged alternately in the tire circumferential direction.

The inner shoulder lateral grooves 37 extend axially inwardly from the inner tread edge Ti and terminate within the inner shoulder land region 14. It is preferred that each of the inner shoulder lateral grooves 37 in this embodiment has a length L10 in the tire axial direction in a range of from 0.75 to 0.85 times a width w7 in the tire axial direction of the inner shoulder land region 14, for example. The inner shoulder lateral grooves 37 configured as such can improve the wet performance and the steering stability in a good balance.

In this embodiment, no cuts or grooves such as sipes are provided in a region between each of the inner shoulder lateral grooves 37 and the inner shoulder main groove 5. Thereby, rigidity of an axially inner part of the inner shoulder land region 14 is surely increased.

The inner shoulder lateral grooves 37 include first groove portions 41 and second groove portions 42 having different angles with respect to the tire axial direction, for example. Each of the first groove portions 41 extends at an angle θ8 (not shown) not more than 5 degrees with respect to the tire axial direction, for example. In each of the inner shoulder lateral grooves 37, the second groove portion 42 extends in a bent manner so as to form a bent groove portion 43 between the first groove portion 41, for example. It is preferred that an angle θ9 of each of the second groove portions 42 with respect to the tire axial direction is in a range of from 10 to 20 degrees, for example. As a more preferred embodiment, a groove center line of each of the first groove portions 41 and the second groove portions 42 extends straight, for example. The inner shoulder lateral grooves 37 configured as such can guide water in the grooves toward the inner tread edge Ti.

It is preferred that a distance L11 in the tire axial direction between the inner tread edge Ti and each of the bent groove portions 43 is in a range of from 0.40 to 0.60 times the width w7 of the inner shoulder land region 14, for example. Thereby, it is possible to obtain the effects described above while suppressing the uneven wear of the inner shoulder land region 14.

As a more preferred embodiment, it is preferred that the second groove portions 42 have a pair of groove edges extending straight and obliquely with respect to the tire axial direction with a groove width between the pair of the groove edges gradually decreasing axially inwardly. The second groove portions 42 configured as such can suppress the uneven wear at inner end portions of the inner shoulder lateral grooves 37.

Each of the inner shoulder sipes 38 has one end connected with the inner shoulder main groove 5 and extends to connect between the inner shoulder main groove 5 and the inner tread edge Ti, for example. As shown in FIG. 1, each of the inner shoulder sipes 38 extends so as to be smoothly connected with one of the third crown sipes 23 adjacent thereto with the inner shoulder main groove 5 therebetween, for example. Thereby, the inner shoulder sipes 38 become easier to open, therefore, it is possible that high frictional force on a wet road surface is expected.

As shown in FIG. 9, each of the inner shoulder sipes 38 includes a first sipe portion 45 and a second sipe portion 46 having different angles with respect to the tire axial direction, for example. The first sipe portion 45 extends at an angle θ10 (not shown) not more than 5 degrees with respect to the tire axial direction, for example. The second sipe portion 46 extends in a bent manner so as to form a bent sipe portion 47 between the first sipe portion 45 and the second sipe portion 46, for example. It is preferred that the second sipe portion 46 is inclined at an angle θ11 in a range of from 15 to 25 degrees with respect to the tire axial direction, for example. As a more preferred embodiment, each of the first sipe portions 45 and the second sipe portions 46 extends straight.

It is preferred that a distance L12 in the tire axial direction between the inner tread edge Ti and each of the bent sipe portions 47 in this embodiment is in a range of from 0.40 to 0.50 times the width w7 of the inner shoulder land region 14, for example. The bent sipe portions 47 configured as such are helpful for suppressing distortion of the ground contacting surface at a center portion of the inner shoulder land region 14.

While detailed description has been made of the tire as an embodiment of the present invention, the present invention can be embodied in various forms without being limited to the illustrated embodiment.

Working Example (Example)

Figure 10:
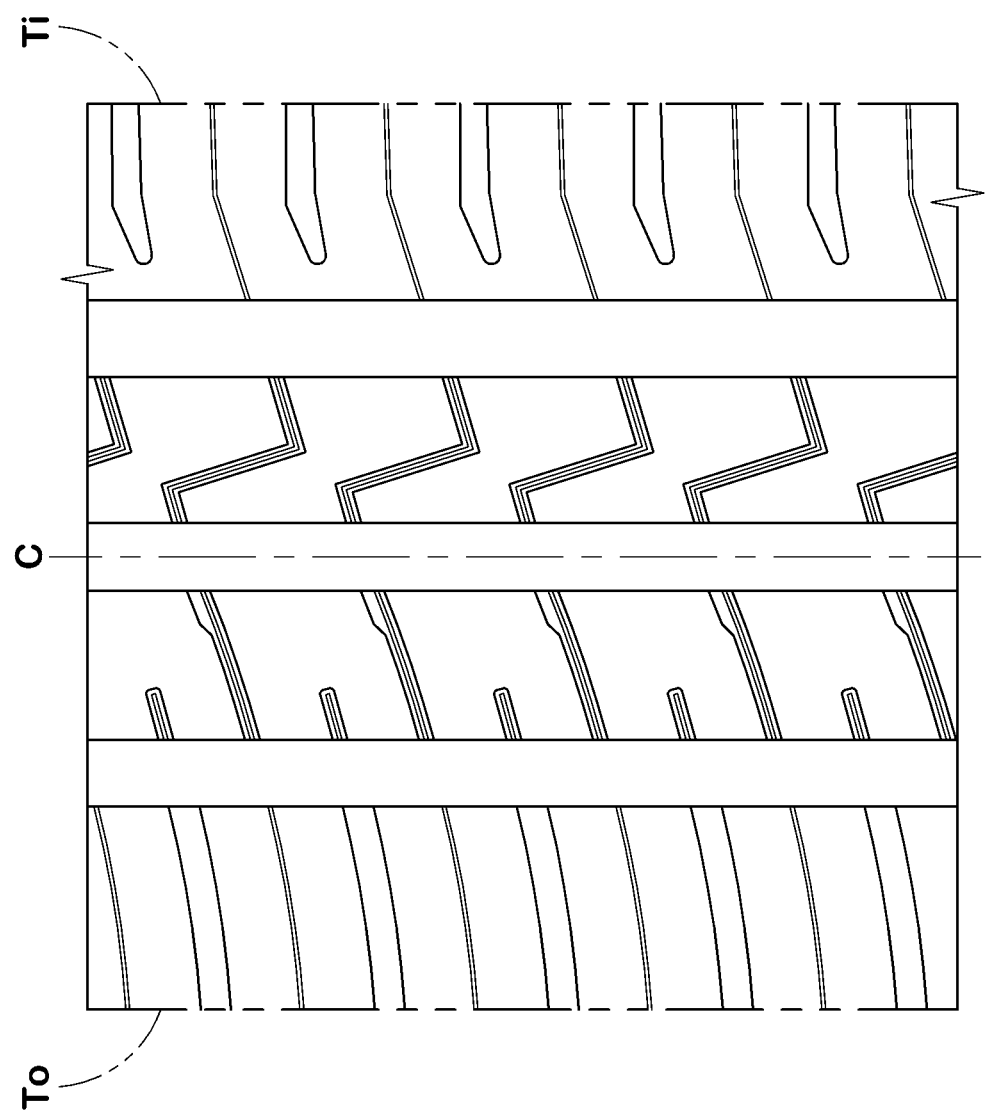
FIG. 10 is a development view of the tread portion of a tire as Reference 1.
Figure 11:
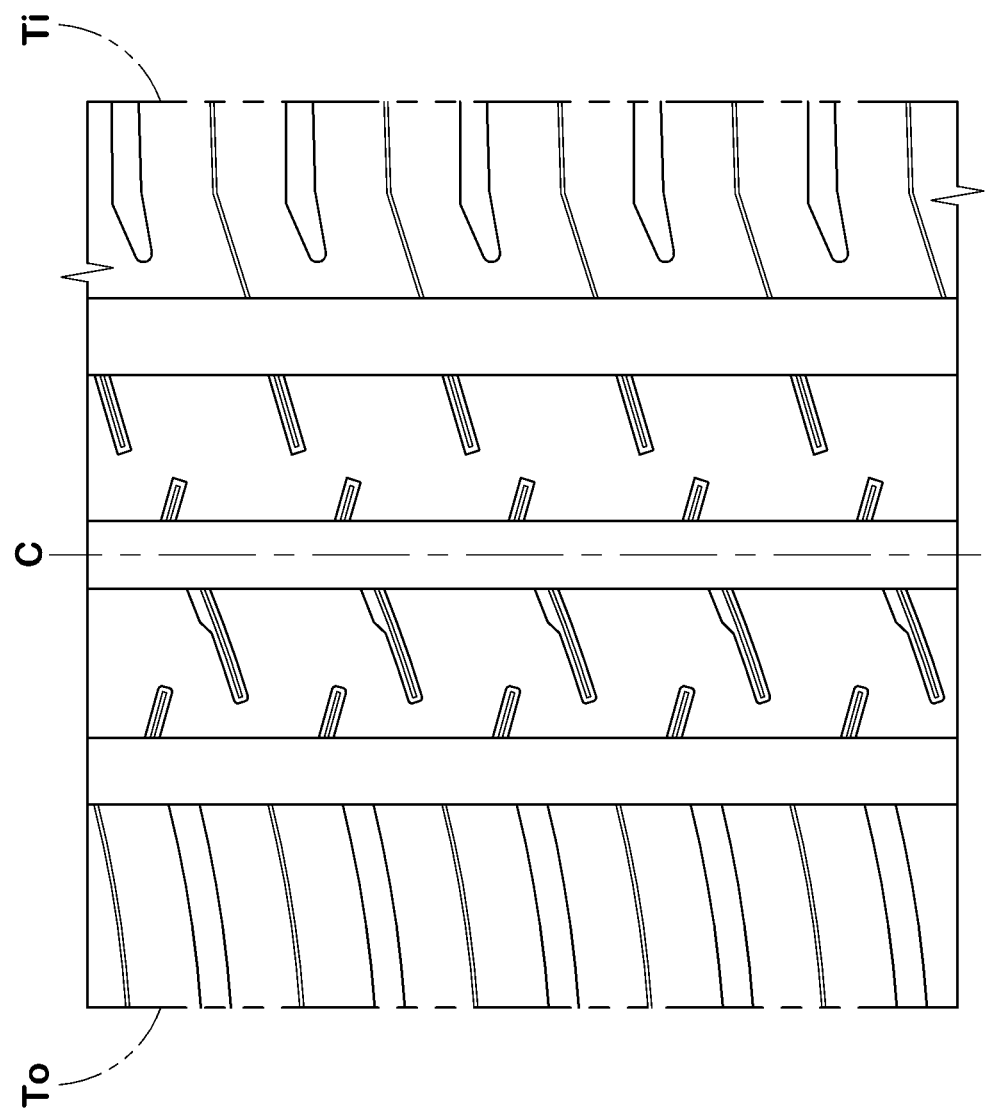
FIG. 11 is a development view of the tread portion of a tire as Reference 2.

Tires of size 205/55R16 having the basic structure shown in FIG. 1 were made by way of test according to the specifications listed in Table 1. As Reference 1, as shown in FIG. 10, a tire having the crown land region provided with full-open sipes was made by way of test. As Reference 2, as shown in FIG. 11, a tire having the outer crown land region and the inner crown land region each provided with the crown sipes having different inclination directions was made by way of test. Each of the test tires was tested for the wet performance and the steering stability. The common specifications and the test methods of the test tires are as follows.

Tire rim: 16×6.5 JJ
Tire inner pressure: 230 kPa
Test car: front wheel drive car with displacement of 2000 cc
Tire mounting position: all wheels The test methods are as follows.

<Wet Performance>

Lateral acceleration (lateral G) of the front wheel was measured while the test car mentioned above was driven on an asphalt road surface having a radius of 100 m and provided with a puddle of 5 mm in depth and 20 m in length. Then the average lateral G at a speed in a range of from 50 to 80 km/h was calculated and the results are indicated by an index based on Reference 1 being 100, wherein the larger the numerical value, the better the wet performance is.

<Steering Stability>

While the test car was driven on a dry road surface, the steering stability was evaluated based on the driver's feeling. The results are indicated by an evaluation point based on Reference 1 being 100, wherein the larger the numerical value, the better the steering stability is.

The test results are shown in Table 1.

From the test results, it can be confirmed that the tires as the examples exerted excellent steering stability while maintaining the wet performance.

Figure 12:
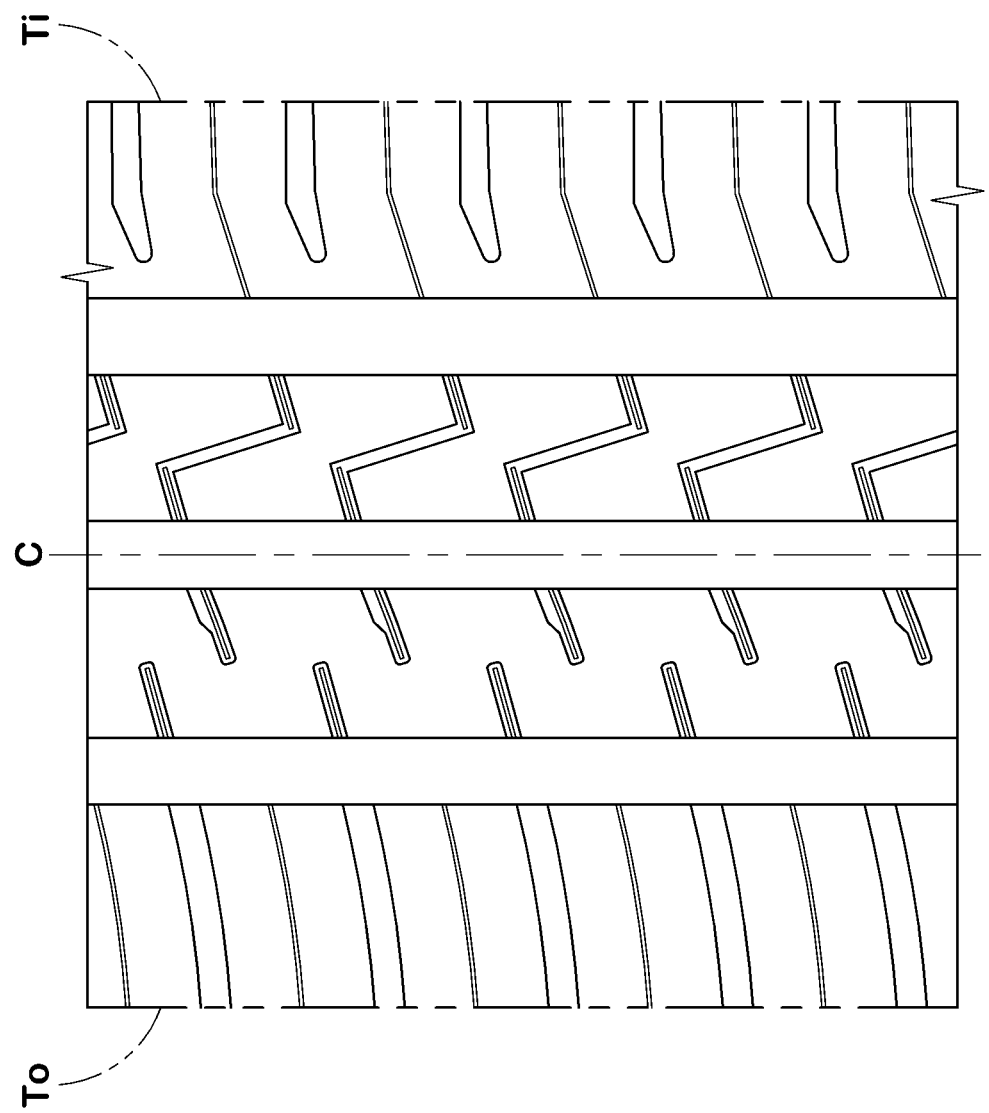
FIG. 12 is a development view of the tread portion of a tire as Reference 3.

Tires of size 205/55R16 having the basic structure shown in FIG. 1 were made by way of test according to the specifications listed in Table 2. As Reference 3, as shown in FIG. 12, a tire having the outer crown land region provided with the first crown sipes and the second crown sipes having the same lengths in the tire axial direction was made by way of test. Each of the test tires was tested for the wet performance and the steering stability on a dry road surface. The common specifications and the test methods of the test tires are as follows.

Tire rim: 16×6.5 JJ
Tire inner pressure: 230 kPa
Test car: front wheel drive car with displacement of 2000 cc
Tire mounting position: all wheels The test methods are as follows.

<Wet Performance>

The lateral acceleration (lateral G) of the front wheel was measured while the test car mentioned above was driven on an initial wet road surface (the whole road surface is wet but no puddle was formed thereon) having a radius of 100 m. Then the average lateral G at the speed in a range of from 50 to 80 km/h was calculated and the results are indicated by an index based on Reference 3 being 100, wherein the larger the numerical value, the better the wet performance is.

<Steering Stability on Dry Road Surface>

While the test car was driven on a dry road surface, the steering stability was evaluated based on the driver's feeling. The results are indicated by an evaluation point based on Reference 3 being 100, wherein the larger the numerical value, the better the steering stability on a dry road surface is.

The test results are shown in Table 2.

TABLE 1

|  | Ref. 1 | Ref. 2 | Ex. 1 | Ex. 2 | Ex. 3 | Ex. 4 | Ex. 5 |
|---|---|---|---|---|---|---|---|
| Figure showing Tread pattern | FIG. 10 | FIG. 11 | FIG. 1 | FIG. 1 | FIG. 1 | FIG. 1 | FIG. 1 |
| Shortest distance L1 of First and Second crown sipes/Shortest distance L2 of Third and Fourth crown sipes | — | 1.4 | 1.8 | 1.5 | 1.7 | 1.9 | 2.0 |
| Overlapping width L6 of First and Second crown sipes/Width W3 of Outer crown land region [%] | — | 3.0 | 3.0 | 3.0 | 3.0 | 3.0 | 3.0 |
| Separation width L9 of Third and Fourth crown sipes/Width W6 of Inner crown land region | — | 0.23 | 0.23 | 0.23 | 0.23 | 0.23 | 0.23 |
| Wet performance [index] | 100 | 93 | 98 | 99 | 98 | 97 | 96 |
| Steering stability [evaluation point] | 100 | 106 | 108 | 105 | 106 | 108 | 108 |

|  | Ex. 6 | Ex. 7 | Ex. 8 | Ex. 9 | Ex. 10 | Ex. 11 | Ex. 12 | Ex. 13 |
|---|---|---|---|---|---|---|---|---|
| Figure showing Tread pattern | FIG. 1 | FIG. 1 | FIG. 1 | FIG. 1 | FIG. 1 | FIG. 1 | FIG. 1 | FIG. 1 |
| Shortest distance L1 of First and Second crown sipes/Shortest distance L2 of Third and Fourth crown sipes | 1.8 | 1.8 | 1.8 | 1.8 | 1.8 | 1.8 | 1.8 | 1.8 |
| Overlapping width L6 of First and second crown sipes/Width W3 of Outer crown land region [%] | 2.0 | 2.5 | 3.5 | 4.0 | 3.0 | 3.0 | 3.0 | 3.0 |
| Separation width L9 of Third and Fourth crown sipes/Width W6 of Inner crown land region | 0.23 | 0.23 | 0.23 | 0.23 | 0.15 | 0.20 | 0.25 | 0.3 |
| Wet performance [index] | 95 | 97 | 98 | 99 | 98 | 98 | 97 | 95 |
| Steering stability [evaluation point] | 109 | 108 | 107 | 105 | 106 | 107 | 108 | 109 |

TABLE 2

|  | Ref. 3 | Ex. 14 | Ex. 15 | Ex. 16 | Ex. 17 | Ex. 18 | Ex. 19 | Ex. 20 | Ex. 21 |
|---|---|---|---|---|---|---|---|---|---|
| Figure showing Tread pattern | FIG. 12 | FIG. 1 | FIG. 1 | FIG. 1 | FIG. 1 | FIG. 1 | FIG. 1 | FIG. 1 | FIG. 1 |
| Length L4 of First crown sipe/Width W3 of Outer crown land region | 0.47 | 0.30 | 0.20 | 0.25 | 0.35 | 0.40 | 0.30 | 0.30 | 0.30 |
| Length L5 of Second crown sipe/Width W3 of Outer crown land region | 0.47 | 0.72 | 0.72 | 0.72 | 0.72 | 0.72 | 0.65 | 0.70 | 0.80 |
| Ratio L4/L5 | 1.00 | 0.42 | 0.28 | 0.35 | 0.49 | 0.56 | 0.46 | 0.43 | 0.38 |
| Length L8 of Fourth crown sipe/Width W6 of Inner crown land region | 0.36 | 0.22 | 0.22 | 0.22 | 0.22 | 0.22 | 0.22 | 0.22 | 0.22 |
| Length L7 of Third crown sipe/Width W6 of Inner crown land region | 0.36 | 0.50 | 0.50 | 0.50 | 0.50 | 0.50 | 0.50 | 0.50 | 0.50 |
| Ratio L8/L7 | 1.00 | 0.44 | 0.44 | 0.44 | 0.44 | 0.44 | 0.44 | 0.44 | 0.44 |
| Wet performance [index] | 100 | 105 | 103 | 104 | 105 | 106 | 104 | 105 | 105 |
| Steering stability [evaluation point] | 100 | 102 | 102 | 102 | 101 | 100 | 103 | 102 | 101 |

|  | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|
| Figure showing Tread pattern | FIG. 1 | FIG. 1 | FIG. 1 | FIG. 1 | FIG. 1 | FIG. 1 | FIG. 1 | FIG. 1 | FIG. 1 |
| Length L4 of First crown sipe/Width W3 of Outer crown land region | 0.30 | 0.30 | 0.30 | 0.30 | 0.30 | 0.30 | 0.30 | 0.30 | 0.30 |
| Length L5 of Second crown sipe/Width W3 of Outer crown land region | 0.85 | 0.72 | 0.72 | 0.72 | 0.72 | 0.72 | 0.72 | 0.72 | 0.72 |
| Ratio L4/L5 | 0.35 | 0.42 | 0.42 | 0.42 | 0.42 | 0.42 | 0.42 | 0.42 | 0.42 |
| Length L8 of Fourth crown sipe/Width W6 of Inner crown land region | 0.22 | 0.15 | 0.20 | 0.25 | 0.30 | 0.22 | 0.22 | 0.22 | 0.22 |
| Length L7 of Third crown sipe/Width W6 of Inner crown land region | 0.50 | 0.50 | 0.50 | 0.50 | 0.50 | 0.40 | 0.45 | 0.55 | 0.60 |
| Ratio L8/L7 | 0.44 | 0.30 | 0.40 | 0.50 | 0.60 | 0.55 | 0.49 | 0.40 | 0.37 |
| Wet performance [index] | 105 | 104 | 105 | 105 | 106 | 104 | 105 | 106 | 106 |
| Steering stability [evaluation point] | 101 | 102 | 102 | 102 | 100 | 102 | 102 | 101 | 100 |

From the test results, it can be confirmed that the tires as the examples exerted excellent wet performance while maintaining the steering stability on a dry road surface.

The invention claimed is:

1. A tire comprising a tread portion comprising two crown land regions and two shoulder land regions divided by a crown main groove extending in a tire circumferential direction and a pair of shoulder main grooves arranged one by one on each side of the crown main groove, wherein
   each of the two crown land regions is provided with a plurality of sipes each having a width less than 1.5 mm,
   the sipes of each of the two crown land regions include only semi-open sipes each having a first end connected with one of the main grooves and a second end terminating within the land region,
   the sipes of the two crown land regions are inclined in a same direction with respect to a tire axial direction, wherein
   the tread portion has a pattern whose position when mounted on a vehicle is specified,
   the two crown land regions include an outer crown land region and an inner crown land region positioned, when the tire is mounted on a vehicle, on an inner side of the vehicle than the outer crown land region,
   the semi-open sipes provided in the outer crown land region include only a plurality of first crown sipes each having the first end connected with the shoulder main groove and only a plurality of second crown sipes each having the first end connected with the crown main groove,
   the semi-open sipes provided in the inner crown land region include only a plurality of third crown sipes each having the first end connected with the shoulder main groove and only a plurality of fourth crown sipes each having the first end connected with the crown main groove,
   a shortest distance L1 in the tire circumferential direction between the second end of one of the first crown sipes and the second end of one of the second crown sipes adjacent thereto is larger than a shortest distance L2 in the tire circumferential direction between the second end of one of the third crown sipes and the second end of one of the fourth crown sipes adjacent thereto,
   the inner crown land region is provided with crown shallow grooves each having a depth less than 2 mm,
   each of the crown shallow grooves extends so as to connect between the second end of one of the third crown sipes and the second end of one of the fourth crown sipes adjacent thereto, and
   the two crown land regions are not provided with a groove having a width more than 3 mm.

2. The tire according to claim 1, wherein the crown shallow grooves are inclined to a direction opposite to the first sipes, the second sipes, the third sipes, and the fourth sipes with respect to the tire axial direction.

3. The tire according to claim 1, wherein if each fourth crown sipe were to extend across the crown main groove, the fourth crown sipe would connect to an adjacent second crown sipe.

4. The tire according to claim 1, wherein at least one of the second crown sipes has a length in the tire axial direction larger than the first crown sipes.

5. The tire according to claim 1, wherein the second crown sipes overlap with the first crown sipes in the tire axial direction.

6. The tire according to claim 1, wherein between the second ends of the third crown sipes are separated in the tire axial direction from between the second ends of the fourth crown sipes.

7. The tire according to claim 1, wherein each of the third crown sipes has an axial length in a range of from 0.40 to 0.50 times an axial width of the inner crown land region.

8. The tire according to claim 7, wherein the axial length of each of the third crown sipe is larger than an axial length of each of the first crown sipes and smaller than an axial length of each of the second crown sipes.

9. The tire according to claim 7, wherein each of the fourth crown sipes has an axial length in a range of from 0.20 to 0.30 times the axial width of the inner crown land region.

10. The tire according to claim 9, wherein the axial length of each of the fourth crown sipes is smaller than the axial length of each of the third crown sipes.

11. The tire according to claim 4, wherein each of the first crown sipes has an axial length in a range of from 0.25 to 0.35 times an axial width of the outer crown land region.

12. The tire according to claim 4, wherein at least one of the second crown sipes has an axial length in a range of from 0.70 to 0.80 times an axial width of the outer crown land region.

13. The tire according to claim 4, wherein a ratio of an axial length of each of the first crown sipes to an axial length of each of the second crown sipes is not less than 0.35 and not more than 0.55.

14. The tire according to claim 5, wherein an overlapping width in the tire axial direction between each of the second crown sipes and each of the first crown sipes is in a range of from 2.0% to 4.0% of an axial width of the outer crown land region.

15. The tire according to claim 2, wherein each of the crown shallow grooves is inclined at an angle in a range of from 60 to 80 degrees with respect to the tire axial direction.

16. The tire according to claim 15, wherein a separation width in the tire axial direction between each of the second ends of the fourth crown sipes and each of the second ends of the adjacent third crown sipes is in a range of from 0.15 to 0.30 times a width in the tire axial direction of the inner crown land region.

17. A tire comprising a tread portion comprising: two crown land regions and two shoulder land regions divided by a crown main groove extending in a tire circumferential direction and a pair of shoulder main grooves arranged one by one on each side of the crown main groove, wherein each of the two crown land regions is provided with a plurality of sipes each having a width less than 1.5 mm,
the sipes of each of the two crown land regions include only semi-open sipes each having a first end connected with one of the main grooves and a second end terminating within the land region,
the sipes of the two crown land regions are inclined in a same direction with respect to a tire axial direction,
wherein
the tread portion has a pattern whose position when mounted on a vehicle is specified,
the two crown land regions include an outer crown land region and an inner crown land region positioned, when the tire is mounted on a vehicle, on an inner side of the vehicle than the outer crown land region,
the semi-open sipes provided in the outer crown land region include a plurality of first crown sipes each having the first end connected with the shoulder main groove and a plurality of second crown sipes each having the first end connected with the crown main groove,
the semi-open sipes provided in the inner crown land region include a plurality of third crown sipes each having the first end connected with the shoulder main groove and a plurality of fourth crown sipes each having the first end connected with the crown main groove,
both the inner crown land region and the outer crown land region are provided with crown shallow grooves each having a depth less than 2 mm,
the outer crown land region is provided with the shallow grooves each extending radially outwardly and continuously from a respective one of the second crown sipes all along the one of the second crown sipes,
each of the shallow grooves in the outer crown land region includes an inner portion and an outer portion having different opening widths,
the inner portion extends within the outer crown land region, and
the outer portion extends between the inner portion and the crown main groove and has an opening width larger than an opening width of the inner portion in a range of from 2.0 to 5.0 mm.

18. The tire according to claim 17, wherein at least one of the second crown sipes has a length in the tire axial direction in a range of from 0.70 to 0.80 times a width in the tire axial direction of the outer crown land region.

19. The tire according to claim 17, wherein a ratio of the opening width of the inner portion to the opening width of the outer portion is in a range of from 0.60 to 0.80.

20. The tire according to claim 17, wherein the second crown sipes overlap with the first crown sipes in the tire axial direction.

* * * * *